(12) United States Patent
Avadhanam et al.

(10) Patent No.: US 10,257,449 B2
(45) Date of Patent: Apr. 9, 2019

(54) PRE-PROCESSING FOR VIDEO NOISE REDUCTION

(71) Applicant: Nvidia Corporation, Santa Clara, CA (US)

(72) Inventors: Niranjan Avadhanam, Laredo, TX (US); Eric Viscito, Shelburne, CA (US); Varun Allagadapa, Bangalore (IN); Thrinadh Kottana, Bangalore (IN)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 14/988,630

(22) Filed: Jan. 5, 2016

(65) Prior Publication Data

US 2017/0195591 A1 Jul. 6, 2017

(51) Int. Cl.
*H04N 5/232* (2006.01)
*H04N 5/357* (2011.01)
*H04N 5/374* (2011.01)
*H04B 1/3827* (2015.01)

(52) U.S. Cl.
CPC ......... *H04N 5/357* (2013.01); *H04N 5/23254* (2013.01); *H04N 5/23267* (2013.01); *H04N 5/374* (2013.01); *H04B 1/3833* (2013.01)

(58) Field of Classification Search
CPC ............... H04N 5/357; H04N 5/23254; H04N 5/23267; H04N 5/374; H04B 1/3833
USPC ..................................................... 348/222.1
See application file for complete search history.

(56) References Cited

U.S. PATENT DOCUMENTS

| | | | | |
|---|---|---|---|---|
| 7,769,089 B1* | 8/2010 | Chou | ..................... | H04N 5/144 375/240.26 |
| 8,144,253 B2* | 3/2012 | Su | .......................... | G06T 5/002 348/575 |
| 8,630,353 B1* | 1/2014 | Puri | ....................... | H04N 19/17 348/721 |
| 8,687,693 B2* | 4/2014 | Orlick | .................. | H04N 19/105 375/240.12 |
| 8,872,977 B2* | 10/2014 | Chiu | ....................... | G06T 7/246 348/606 |
| 9,036,695 B2* | 5/2015 | Yang | ....................... | G06T 5/002 375/240.01 |
| 9,870,598 B2* | 1/2018 | Allagadapa | ............... | G06T 1/20 |
| 9,934,606 B2* | 4/2018 | Sathe | ..................... | G06T 15/80 |
| 9,943,289 B2* | 4/2018 | Martins | ............... | A61B 8/5269 |

(Continued)

*Primary Examiner* — Pritham D Prabhakher

(57) ABSTRACT

Embodiments of the present invention are directed to methods and systems for performing automatic noise reduction in video. According to one aspect of the invention, a video noise-reducing system is provided consisting of a noise estimator, a motion classifier, two stages of filters, each including a spatial and temporal filter, and a combiner. The system adapts to noise level and to scene content to find at each location in the image a balance of noise reduction and detail preservation. Temporal Infinite Impulse Response (IIR) filtering provides a high level of detail-preserving noise reduction where motion allows, while non linear spatial filtering provides edge-preserving noise reduction in areas where the temporal filter would introduce motion artifacts. A spatial-temporal combiner provides smooth transition and balance between the two filtering modes; this block also enables use of external cues to produce a visually pleasing output based on ambient conditions.

19 Claims, 11 Drawing Sheets

(56) References Cited

U.S. PATENT DOCUMENTS

| | | | | |
|---|---|---|---|---|
| 2001/0048720 A1* | 12/2001 | Koshiba | ............... | H04N 19/51 375/240.16 |
| 2005/0094889 A1* | 5/2005 | Lin | ............... | G06T 5/002 382/261 |
| 2006/0285020 A1* | 12/2006 | Shin | ............... | H04N 5/21 348/701 |
| 2007/0097236 A1* | 5/2007 | Yoo | ............... | H04N 1/409 348/241 |
| 2008/0085060 A1* | 4/2008 | Bosco | ............... | G06K 9/40 382/264 |
| 2009/0175535 A1* | 7/2009 | Mattox | ............... | G06K 9/3241 382/164 |
| 2010/0165207 A1* | 7/2010 | Deng | ............... | H04N 5/144 348/620 |
| 2010/0214448 A1* | 8/2010 | Ouzilevski | ............... | G06T 5/20 348/231.99 |
| 2010/0245604 A1* | 9/2010 | Ohmiya | ............... | G03B 5/00 348/208.99 |
| 2011/0019082 A1* | 1/2011 | Su | ............... | G06T 5/002 348/441 |
| 2011/0019094 A1* | 1/2011 | Rossignol | ............... | G06K 9/40 348/607 |
| 2012/0026368 A1* | 2/2012 | Cote | ............... | G06T 3/4015 348/242 |
| 2013/0083246 A1* | 4/2013 | Chen | ............... | G06T 5/002 348/620 |
| 2013/0121416 A1* | 5/2013 | He | ............... | H04N 19/597 375/240.14 |
| 2013/0242198 A1* | 9/2013 | Lee | ............... | H04N 5/213 348/618 |
| 2013/0301703 A1* | 11/2013 | Puri | ............... | H04N 19/124 375/240.02 |
| 2016/0284060 A1* | 9/2016 | Allagadapa | ............... | G06T 1/20 |

* cited by examiner

PRE-PROCESSING FOR VIDEO NOISE REDUCTION

TECHNICAL FIELD

Embodiments of the invention relate generally to improving the output of video capture devices, such as cameras and camera modules. More specifically, the embodiments of the claimed invention are directed to the pre-processing of captured video to reduce noise and artifacts due to low-light conditions and/or motion.

BACKGROUND

Image acquisition devices such as camera modules are commonly integrated into various other mobile computing devices, such as smartphones or tablet computers. In particular, video capture using the camera modules of smartphones and tablet devices is extremely popular and a frequent activity for many users, both commercially and recreationally.

Typical image acquisition devices in modern camera modules use complementary metal oxide sensors (CMOS) sensors as image sensing devices for capturing frames (images) in a video. While efficient and well suited for this purpose, CMOS sensors are well known to be prone to noise effects, especially sensor noise in non-optimal light conditions during video capture modes. Consequently, the quality of the capture video—especially in lower light conditions—suffers from the inherent limitations of the sensor.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments of the present invention are directed to methods and systems for substantially reducing noise in video data. According to a first aspect, a method for performing automatic noise reduction by pre-processing captured video data. In one or more embodiments, the pre-processing may be performed by estimating a local level of noise, using the estimate to classify regions of motion in the captured image data, and performing noise reduction using both the noise estimate and motion classification, while preserving inherent structure, features, and motion in the video.

According to one or more embodiments, this pre-processing may also be extended to previews by using the pre-processed image data prior to generating the preview display. Especially in lower light conditions, noisy data from the Camera Block may appear in the preview and to the Video Encoder in conventional video capture techniques. Reducing the noise on the preview can therefore improve the overall user capture experience. In the case of typical techniques, not only is some of the noise that is captured sent to storage in the eventual bit-stream, even more noise may be generated by the Video Encoder since encoding artifacts can also be created due to the encoder rate control assigning bits to the noise. Suppression of this noise prior to encoding assures noise-reduced output while also preserving important image structure and features present in the original video.

According to a second aspect of the invention, a video noise-reducing system is provided consisting of a noise estimator, a motion classifier, two stages of filters, each stage including a spatial and temporal filter, and a combiner. The system adapts to noise level and to scene content to find, at each location in the image, a balance of noise reduction and detail preservation. Temporal Infinite Impulse Response (IIR) filtering provides a high level of detail-preserving noise reduction where motion allows, while non linear spatial filtering provides edge-preserving noise reduction in areas where the temporal filter would introduce motion artifacts. A spatial-temporal combiner provides smooth transition and balance between the two filtering modes; this block also enables use of external cues to produce a visually pleasing output based on ambient conditions.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
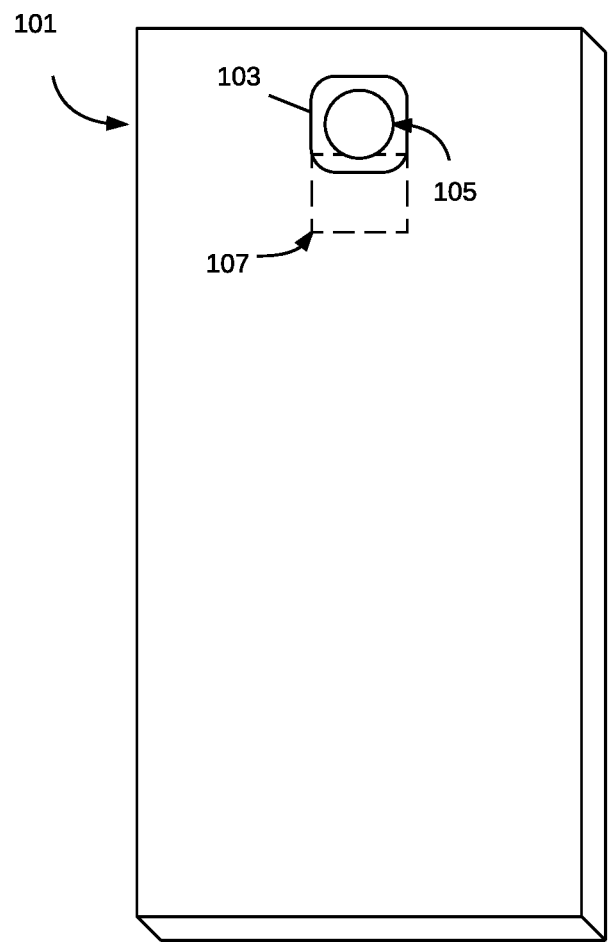
FIG. 1 depicts an exemplary illustration of a camera module disposed in a mobile computing device, in accordance with an embodiment of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follow are presented and discussed in terms of a process. Although steps and sequencing thereof are disclosed in figures herein describing the operations of this process, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Video Capture Device and Operating Environments

Embodiments of the claimed subject matter are directed to methods and systems for performing noise reduction in video frames captured using an image-capture device. FIG. 1 shows an exemplary illustration of a camera module disposed in a mobile computing device 100, in accordance with an embodiment of the present invention. As presented in FIG. 1, the mobile computing device 100 is implemented as mobile telephone, such as a smartphone 101. According to various embodiments, the smartphone 101 is equipped with a camera module 103. The camera module may include one or more lenses in a series. In further embodiments, one or more filters (e.g., infrared filters) may be disposed below, above, and/or in between two or more of the plurality of lenses. The series of lenses 101 may be positioned over an image sensor configured to receive incident input (light) through the lens. The image sensor itself may be implemented as a photo diode, for example, and may be disposed over a substrate substantially composed of, for example, silicon dioxide ($SiO_2$).

According to various embodiments, the camera module 103 may be wholly or partially encapsulated within a larger mobile computing device, such as a digital camera, smartphone, personal data assistant, e-reader, tablet or laptop computer, etc. As depicted, a substantial portion (indicated by the dotted line portion) of the camera module 103 is enclosed within the structure of the smartphone 101. In some embodiments, only a top lens 105 of the camera module 103 may be exposed, allowing access to input (light rays). All other portions of the camera module 103, such as an image sensor (not shown) or connection terminal 107 may be enclosed by, or otherwise substantially obstructed from external access by the smartphone 101. As presented in FIG. 100, smartphone 101 may be used to capture photographic images via camera module 103. Control of the camera module 103 may be managed through a user interface of smartphone 101, such as through physical buttons, or on-screen graphical user interfaces depicted in a display of smartphone 101. In still further embodiments, usage of certain hardware resources such as memory and/or one or more processors in smartphone 101 may be shared with camera module 103 for image acquisition and production purposes.

Figure 2:
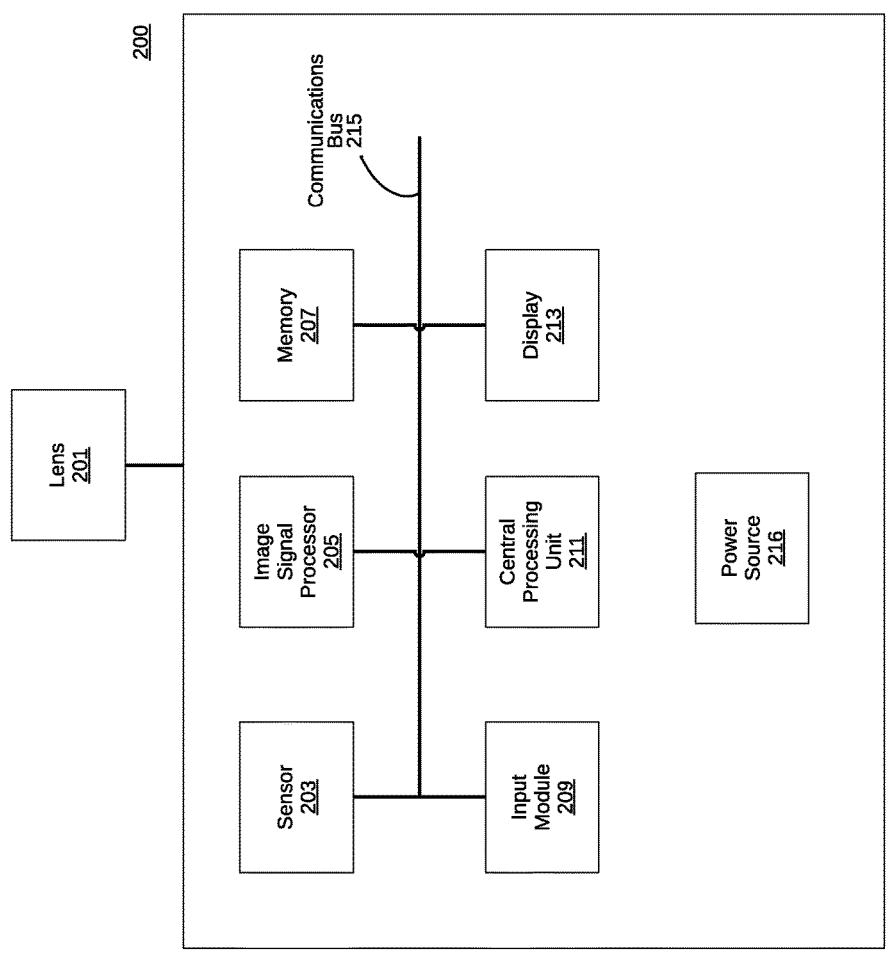
FIG. 2 depicts an exemplary operating environment in which various embodiments of the present invention may be performed, in accordance with various embodiments of the present invention.

FIG. 2 depicts an illustration of an exemplary operating environment in accordance with one embodiment of the present invention. Digital system 200 depicts the components of a basic system in accordance with embodiments of the present invention providing the execution platform for certain hardware-based and software-based functionality. Although specific components are disclosed in system 200 it should be appreciated that such components are examples. That is, embodiments of the present invention are well suited to having various other components or variations of the components recited in system 200. It is appreciated that the components in system 200 may operate with other components other than those presented, and that not all of the components of system 200 may be required to achieve the goals of system 200. In alternate embodiments, the system 200 is not necessarily mobile.

In a typical embodiment, System 200 includes sensor 203, image signal processor (ISP) 205, memory 207, input module 209, central processing unit (CPU) 211, display 213, communications bus 215, and power source 216. Power source 216 supplies power to system 200 and may, for example, be a DC or AC power source, and may be a battery. CPU 211 and the ISP 205 can also be integrated into a single integrated circuit die and CPU 211 and ISP 205 may share various resources, such as instruction logic, buffers, functional units and so on, or separate resources may be provided for image processing and general-purpose operations. System 200 can be implemented as, for example, a digital camera, cell phone camera, game console, portable device (e.g., audio device, entertainment device, handheld device), webcam, video device (e.g., camcorder) and the like.

Sensor 203 receives light via a lens 201 and converts the light received into a signal (e.g., digital or analog). According to some embodiments, lens 201 may be permanently attached to the system 200. Alternatively, lens 201 may be detachable and interchangeable with lens of other properties. These properties may include, for example, focal lengths, apertures and classifications. In typical embodiments, lens 201 may be constructed of glass, though alternate materials such as quartz or molded plastics may also be used. Sensor 203 may be any of a variety of optical sensors including, but not limited to, complementary metal-oxide-semiconductor (CMOS) or charge-coupled device (CCD) sensors. Sensor 203 is coupled to communications bus 215 and may provide image data received over communications bus 215. In further embodiments, sensor 203 includes light intensity sensing capability, and the image data received may include data corresponding to the determined intensity of the light in a scene or image.

Image signal processor (ISP) 205 is coupled to communications bus 215 and processes the data generated by sensor 203. More specifically, image signal processor 205 processes data from sensor 202 for storing in memory 207. For example, image signal processor 205 may compress and determine a file format for an image to be stored in within memory 207.

The input module 209 allows the entry of user-input into system 200 which may then, among other things, control the sampling of data by sensor 203 and subsequent processing by ISP 205. Input module 209 may include, but is not limited to, navigation pads, keyboards (e.g., QWERTY), buttons, touch screen controls (e.g., via display 213) and the like.

The central processing unit (CPU) 211 receives commands via input module 209 and may control a variety of operations including, but not limited to, sampling and configuration of sensor 203, processing by ISP 205, and management of images (e.g., the addition, transfer, and removal) and/or video from memory 207.

Noise Reduction with Pre-Processing

Figure 3:
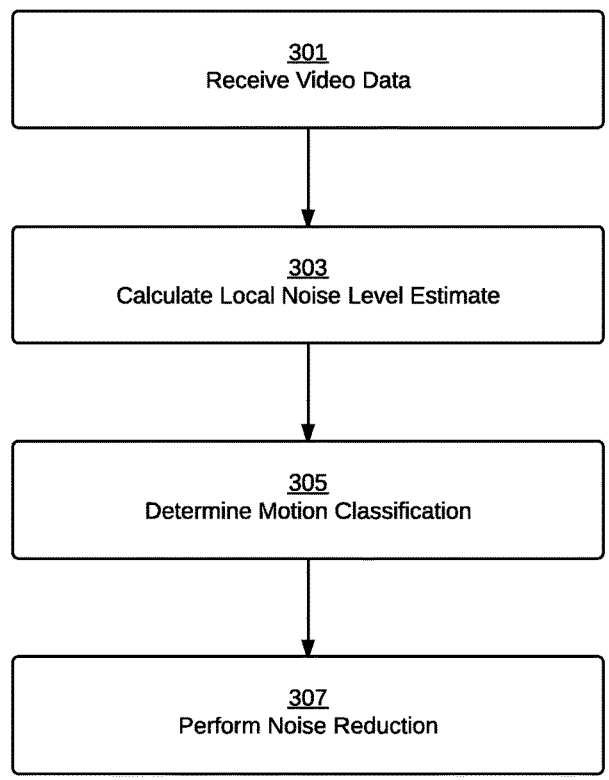
FIG. 3 depicts a flowchart of an exemplary computer implemented process for reducing noise in video, in accordance with various embodiments of the present invention

A flowchart (300) of a novel pre-processing process that substantially reduces noise in captured video is depicted in FIG. 3. This method receives input (step 301) such as captured video data, estimates a local level of noise (step 303), uses the estimate to help in classification of motion regions (step 305) and uses the noise estimate and the motion classification to optimally perform noise reduction (305) while preserving the inherent structure, features, and motion in the video. In one or more embodiments, this method can be used to reduce noise in the camera preview screen display as well. Steps 301 to 307 of FIG. 3 are described in greater detail below and may be implemented, in whole or in part, as a series of programmed instructions executable by a processor or processing device in a computer or computing device, e.g., mobile computer.

As depicted in step 301, input is received by a noise-reduction system. The input may consist of captured video data comprising one or more of a plurality of frames (corresponding images) generated and recorded by, for example, a camera, camera module, or any other image capture device. In one or more embodiments, the noise-reduction system may be implemented as an integrated application executing in a computing device. In still further embodiments, noise reduction may be performed contemporaneously with recording (image capture). According to such embodiments, input may be received as a series of frames, with the noise-reduction system being applied to each (current) frame as it is received, for instance.

At step 303, a local noise level estimate is computed for the video data received in step 301. In one or more embodiments, the local noise level estimate may be computed for the current (or most recent) frame captured by an image capture device and received as input at step 301. According to one or more embodiments, sensor noise can be generated from a Poisson process and is therefore dependent on the amount of light impinging on the sensor. As such, substantial noise cancellation can be achieved by estimating noise levels in local neighborhoods. The noise level estimation algorithm computes the noise estimate on non-overlapping regions (blocks) in each frame of video, with the size of the blocks being variable (e.g., 8×8, 16×16, etc.), depending on the hardware resources available.

Homogenous areas within the non-overlapping blocks are hierarchically identified using the strength of one or more directional activity operators. For example, the mean of absolute deviation—which is robust against outliers—may be used in the homogenous areas to estimate the noise level. This estimate may be further smoothed spatially (e.g., by calculating a weighted sum of neighboring areas) and/or temporally (e.g., by applying a first-order IIR filter). With the resultant frame—assuming object homogeneity—approximately reflecting a signal level dependent noise estimate.

According to one or further embodiments, the noise estimate further incorporates a simple local video-dependent texture protection scheme. For example, a bilateral spatial filter may be applied based on the local noise estimate computed in step 303 to produce a spatially filtered output, with the characteristics of the filter being adaptive to video content. In one embodiment, the generic representation of a bilateral filter BF at a given pixel p of image I may be expressed as:

$$BF[I]_p = \frac{1}{w_p} \sum_{q \in S} G_{\sigma_s}(\|p-q\|) G_{\sigma_r}(|I_p - I_q|) I_q$$

Where gamma s and gamma r are the spatial and radiometric sigma values for G which is the Gaussian distribution, and the normalization factor Wp is given by:

$$w_p = \sum_{q \in S} G_{\sigma_s}(\|p-q\|) G_{\sigma_r}(|I_p - I_q|)$$

In one embodiment, the parameters of the filter sigma s and sigma r are chosen to adaptively suppress the noise measured by the estimate. This output is termed spatial output y_s[i,j]. According to one or more embodiments, the output may comprise a separable form of the bilateral filter.

According to one or more embodiments, an IIR filter may be then applied based on the local noise estimate to produce a temporally filtered output, with the characteristics of the filter also being adaptive to the video content. For example, the parameter of the filter may be chosen to adaptively suppress the noise measured by the estimate. This output is termed temporal output y_t[i,j]. A first order IIR filter may be used for temporal filtering to produce an output y(t) by applying recursively alpha blending of the current frame x(t) with previous temporally filtered frame y(t−1).

$$y(t) = \alpha y(t-1) + (1-\alpha) x(t)$$

At step 305, a motion classifier is applied to the local estimate computed at step 303. For example, calculating the sum of Square difference (SSD) can be used to determine motion in the content and separates motion into various classes. According to the full-complexity version of the technique, the spatial and temporal filters used in the motion classifier differ from the spatial and temporal filters used for noise filtering. By optimally tuning the parameters of the bilateral spatial filter and the temporal IIR filter used in the motion classifier based on the noise estimate, a more robust local motion classification may be calculated since the SSD operates on de-noised data and is therefore more reliable. The SSD output can be converted to a motion estimate using a power law with variable tuning parameters, in one embodiment.

Figure 7:
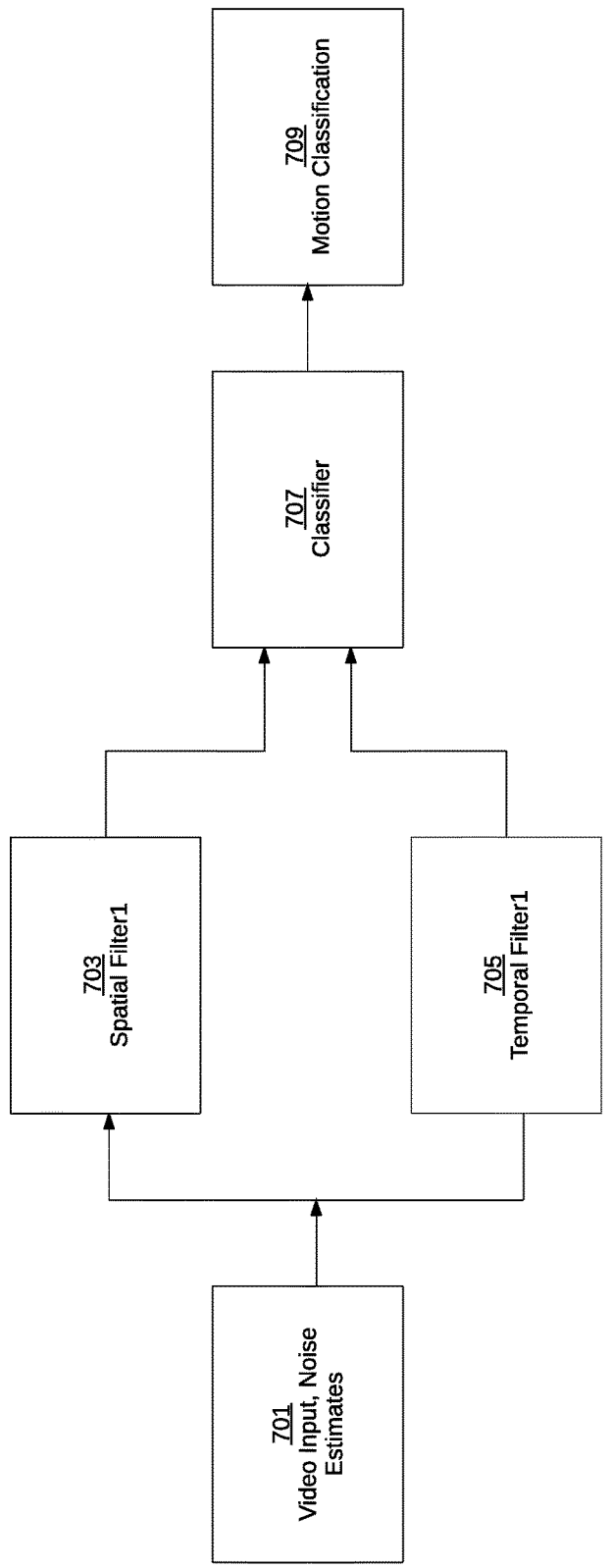
FIG. 7 depicts a block diagram of an exemplary motion classifier with spatial and temporal filters, in accordance with various embodiments of the present invention.
Figure 8:
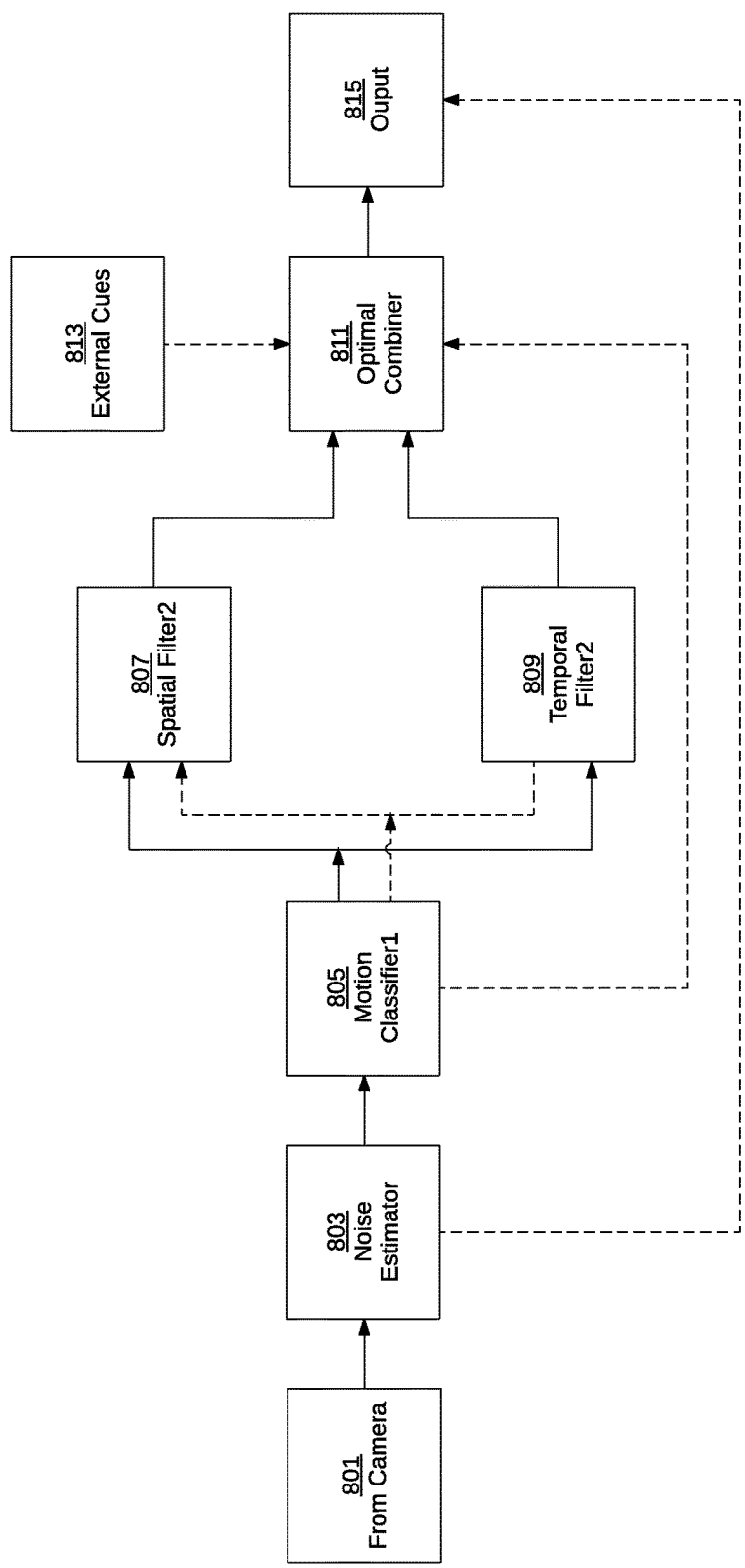
FIG. 8 depicts a block diagram of an exemplary noise reduction system with noise filtering operating in a spatial-temporal parallel mode, in accordance with various embodiments of the present invention.

At step 307, the noise level from step 1 is reduced (suppressed) by a novel combining of the spatially and temporally filtered outputs from the motion classification in step 305 to achieve a near optimal noise suppression. These spatially and temporally filtered outputs can be produced as a result of a second stage of spatial and temporal filtering (as shown in FIGS. 7 and 8 described below) or can be based on the outputs of the first stage of spatial and temporal filtering (as shown in the lower complexity methods FIGS. 9 and 10 described below). In the case of a full-complexity solution, as depicted in FIGS. 7 and 8, the spatial and temporal filters used in noise filtering (spatial filter2 and temporal filter2) differ from the spatial and temporal filters used in the motion classifier (spatial filter 1 and temporal filter1).

According to one or more embodiments, the noise reduction is performed by an optimal combiner, which takes into consideration the noise level estimate (from step 303) and the motion segmentation (of step 305), as well as potential eternal cues (statistics from the image processing pipeline, input from ambient light sensor, etc.) to produce the final output. For example, Spatial y_s(t) and temporal filtered y_t(t) images can be blended together in a simple fashion to produce the final output y_o(t).

$$y\_o(t)=\beta y\_s(t)+(1-)\beta y\_t(t)$$

In the above example, β is a pixel wise parameter that can be dependent on noise estimate, motion and lighting conditions.

Figure 9:
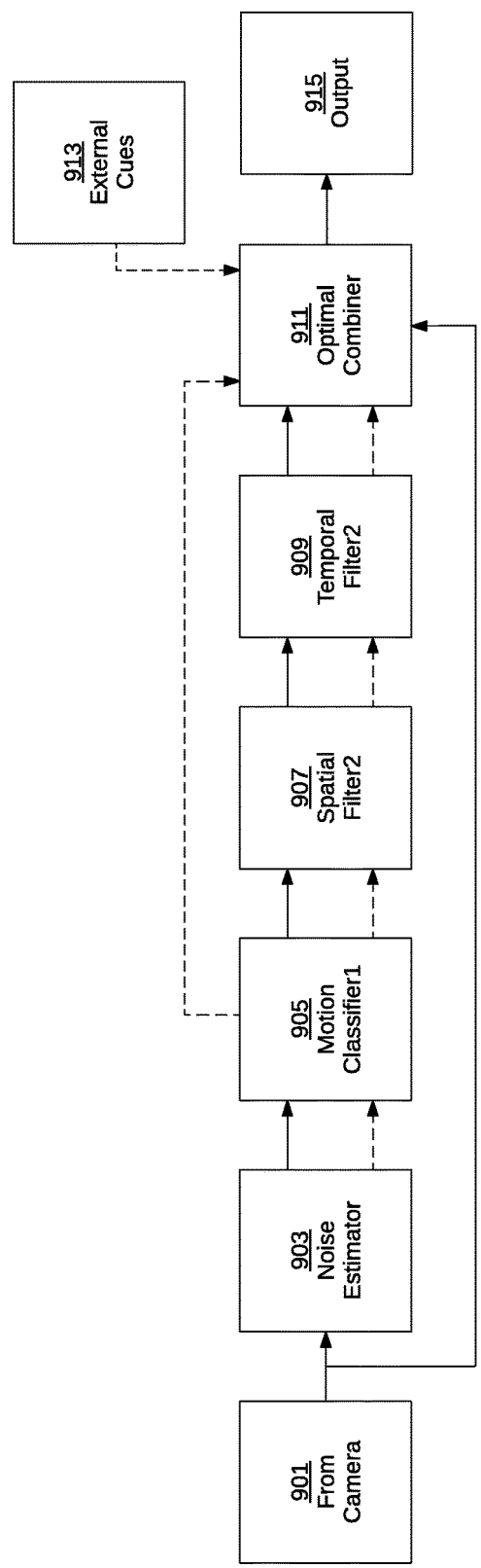
FIG. 9 depicts a block diagram of an exemplary noise reduction system with noise filtering operating in a spatial-temporal cascade mode, in accordance with various embodiments of the present invention.
Figure 10:
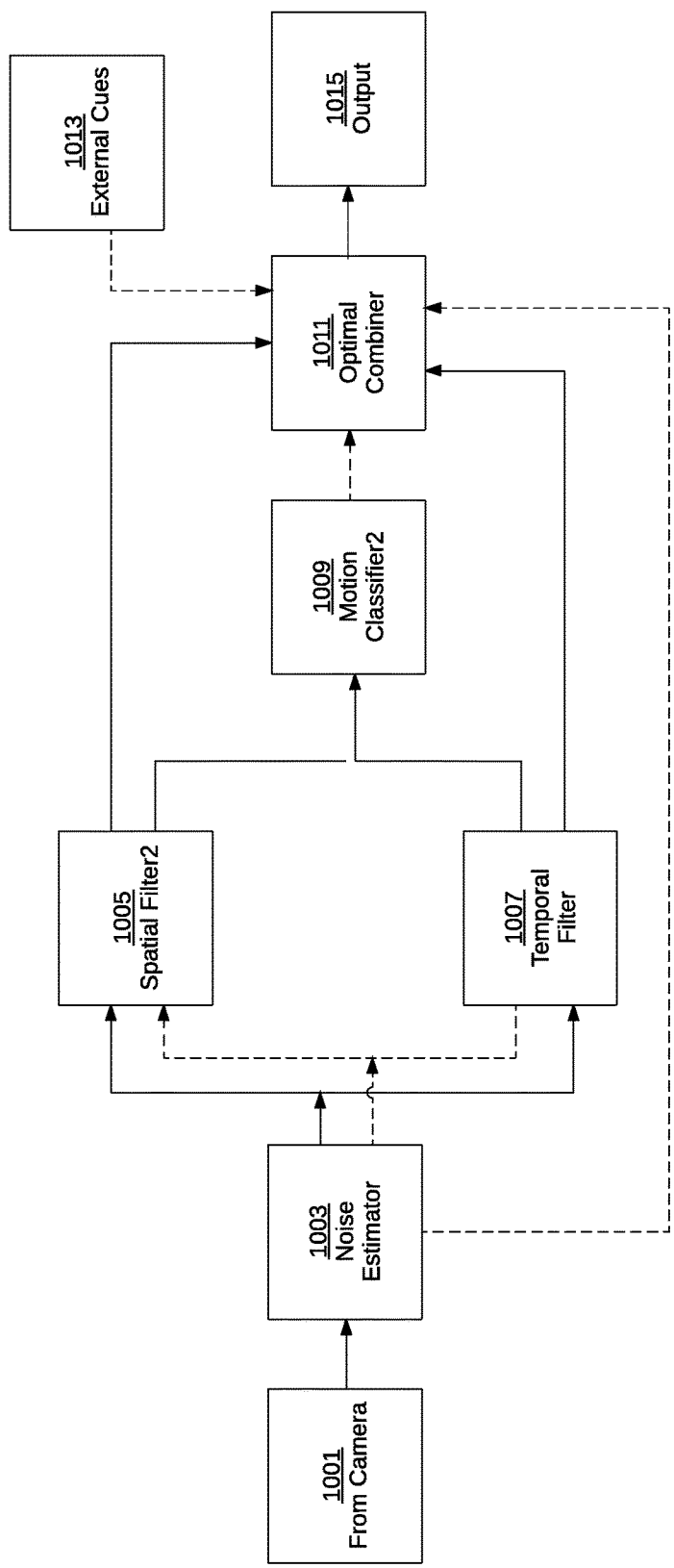
FIG. 10 depicts a block diagram of an exemplary lower complexity noise reduction system with noise filtering operating in a spatial-temporal parallel mode, in accordance with various embodiments of the present invention.

When the noise level is very high, the cascade version of Spatial-temporal filtering (shown in alternate complexities in FIGS. 8 and 10) may be used, depending on the capabilities of the underlying hardware (e.g., processor). In this embodiment, there are two key ideas incorporated to effectively reduce noise while preserving sharpness. Since the spatially filtered pixels in the cascade version may introduce blurriness, the strength of the spatial filter is reduced. To compensate, the temporal filter is made more effective by a 2-step method—first an IIR filter step is applied as before, followed by applying a range filter (e.g., a bilateral filter within constant spatial coefficients that performs filtering based on photometric similarity between pixels) by extending the support of the temporal filter. Since there may still be the potential for some loss of sharpness, a small contribution of the original noisy pixel may be added in the combiner to restore sharpness (as shown in FIGS. 8, 9, and 10).

Embodiments of the present invention comprise a video noise-reducing system consisting of a noise estimator, a motion classifier, two stages of filters, each including a spatial and temporal filter, and a combiner. The system adapts to noise level and to scene content to find, at each location in the image, a balance of noise reduction and detail preservation. Temporal Infinite Impulse Response (IIR) filtering provides a high level of detail-preserving noise reduction where motion allows, while non linear spatial filtering provides edge-preserving noise reduction in areas where the temporal filter would introduce motion artifacts. A spatial-temporal combiner provides smooth transition and balance between the two filtering modes; this block also enables use of external cues to produce a visually pleasing output based on ambient conditions.

According to one or more embodiments, the noise reduction system described above may be implemented in a computing device (such as a mobile telephone, tablet, or laptop device) that includes a image capture system capable of capturing successive images as frames in a video. In one or more embodiments, the camera may comprise a plurality of CMOS sensors. While effective for capturing images and video, during lower light conditions, undesirable sensor noise may be generated during video capture. It is appreciated that pre-processing the captured video before storage and/or generating a preview improve the quality of the overall video capture.

Figure 4:
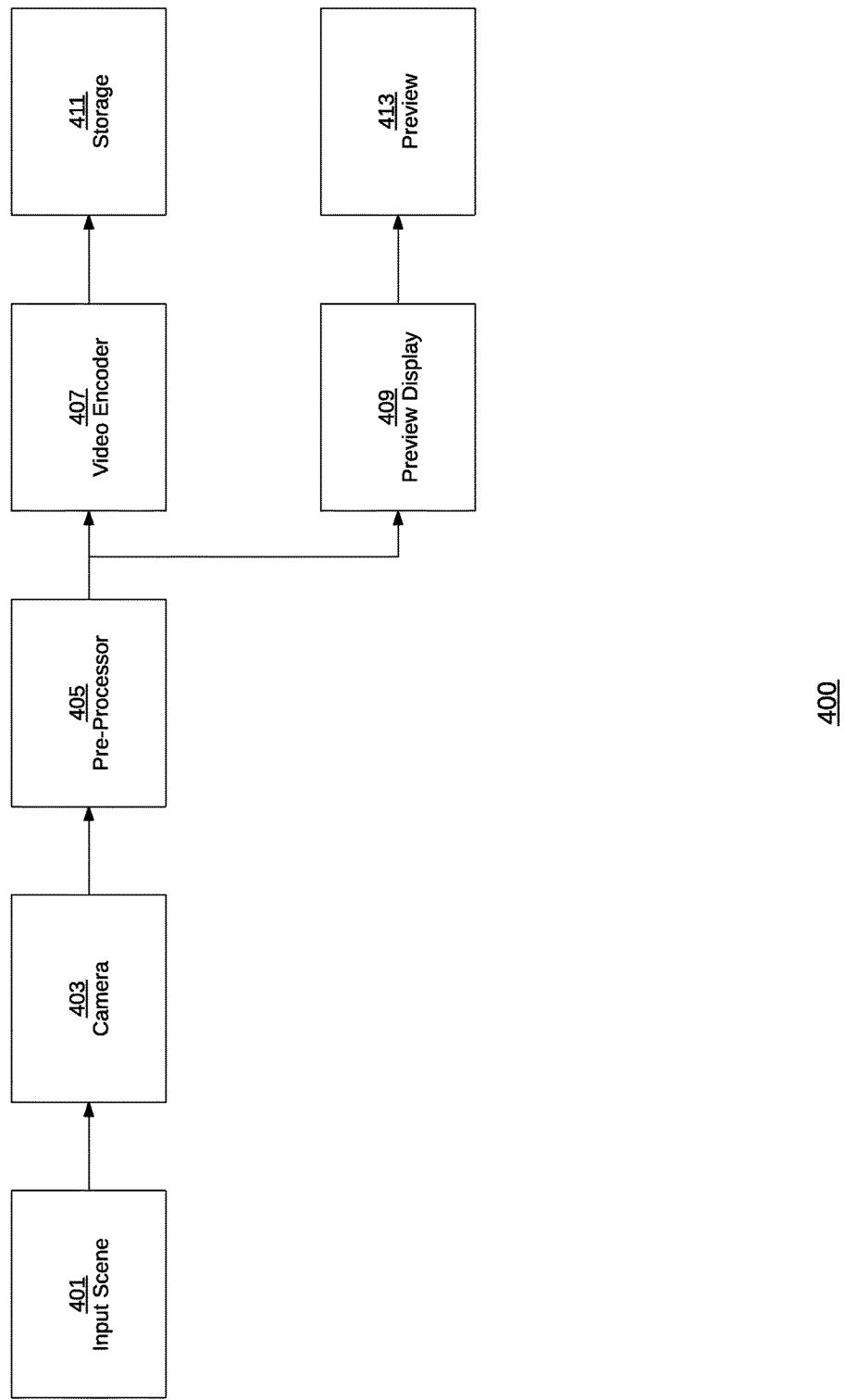
FIG. 4 depicts a block diagram of an exemplary video capture pipeline, in accordance with various embodiments of the present invention.

FIG. 4 depicts the basic sub-blocks in a video capture pipeline (400). As depicted in FIG. 4, a video capture pipeline according to embodiments of the invention includes a camera (403), a pre-processor (405), a video encoder (407) and preview display (409). According to various embodiments, an input scene (401) captured by the camera (403) is pre-processed in the pre-processor (405), after which the stream of data is encoded (compressed) in a video encoder (407) before being transferred into storage (411). In one or more embodiments, a preview display (409) may be generated contemporaneously with the video encoding and transmitted to a display (413) for the user to preview.

Figure 5:
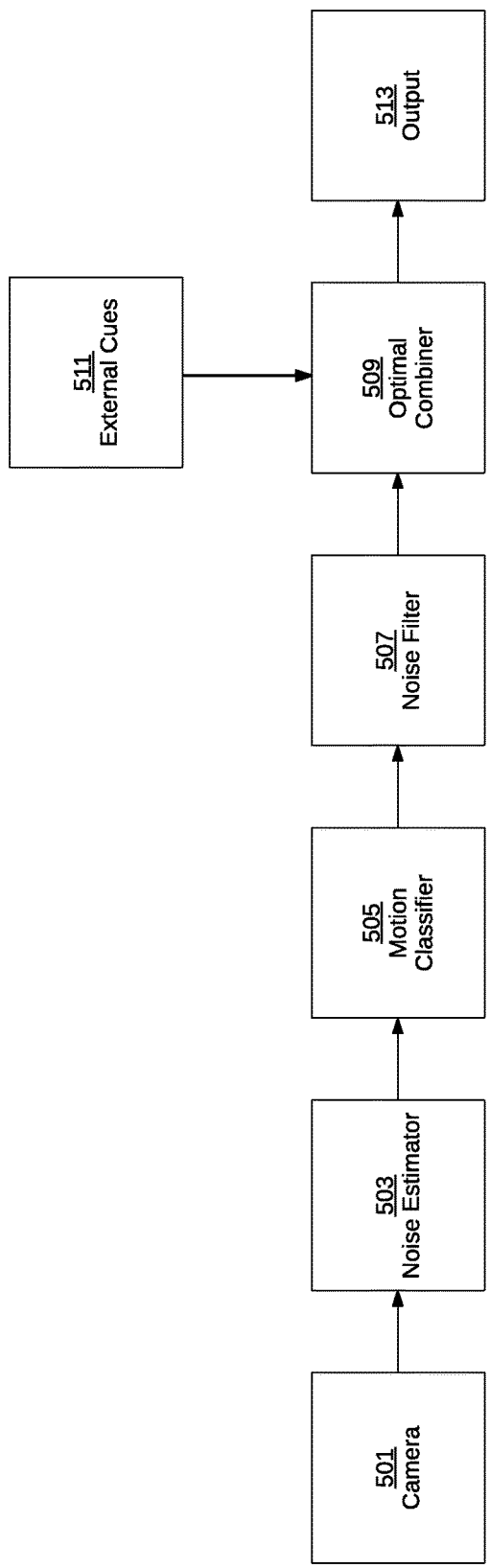
FIG. 5 depicts a block diagram of an exemplary pre-processing system, in accordance with various embodiments of the present invention.

FIG. 5 depicts a block level view of the noise reduction system (500) described in accordance with one embodiment here. As depicted in FIG. 5, input from a camera or camera module (501) is pre-processed by applying a noise-estimation step (503) to produce a robust local noise estimate. The noise estimate incorporates a texture protection step that preserves features in the video. A motion classifier (505) is used subsequently to provide motion information, which is then combined with the original noise estimate to adapt a noise filter (507). The outputs of the noise filter (507) are then blended in the combiner (509). According to one or more embodiments, the combiner (509) may also use external cues (511)—for example, information about ambient settings from a high level application—to produce a visually pleasing video output (513).

Figure 6:
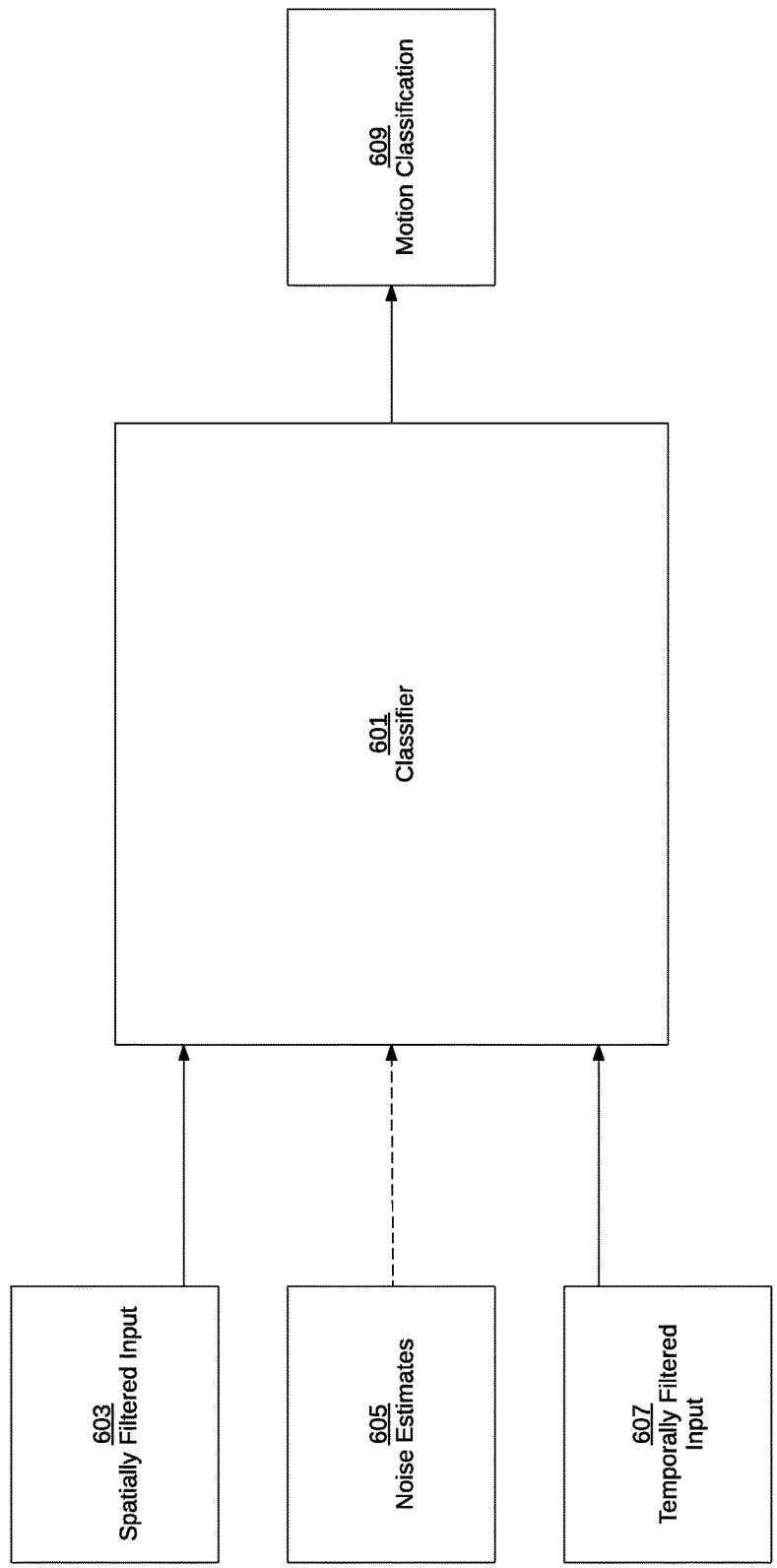
FIG. 6 depicts a block diagram of an exemplary motion classifier, in accordance with various embodiments of the present invention.

FIG. 6 shows a high level view of a motion classifier (600) in accordance with various embodiments of the claimed invention. As depicted in FIG. 6, the motion classifier (600) uses the noise estimate(s) (605) and spatially (603) and temporally (607) filtered video data to separate areas of each video frame into various motion classes (609). For example, the classes may be separated as: very high, high, medium, low, very low, and no motion.

FIG. 7 depicts an exemplary architecture (700) of a motion classifier (707) which uses a separate set of spatial (703) and temporal (705) filters specifically tuned for motion classification (709). According to embodiments, by optimally tuning the parameters of the bilateral spatial filter and the temporal HR filter based on the noise estimate (701), a better local motion estimate can be produced since the noise suppression can be balanced and tuned to the input noise level.

The noise reduction is achieved using a subsequent noise reduction stage, which takes into account the noise estimate and the motion classification. The noise reduction stage itself can have several variations depending on the noise level (based on the estimate) and on the complexity of the implementation.

FIG. 8 shows a detailed view of a noise reduction system (800) with the noise filter operating in a Spatial-temporal parallel mode. As depicted in FIG. 8, the noise reduction system (800) includes input—such as video data—from a camera or camera module (801), and a noise estimator (803) that receives the input data and estimates a local noise level. FIG. 8 also includes a motion classifier (805) that classifies motion in a frame of input based on the noise level estimate. While the spatial-temporal filtering was depicted in FIG. 7 as being performed after the noise estimation stage, a pair of spatial (807) and temporal (809) filters performed may also be applied after the motion classification, which a combiner (811) then combines with external cues (813) to generate an output (815) with effective noise reduction. As depicted in FIG. 8, the second stage of filtering may be performed in parallel according to some embodiments. The broken lines show non-video information and solid lines show the flow of video buffers.

Alternately, based on the noise estimate, it may be more optimal to operate a system (900) in a Spatial-temporal cascade mode as shown in FIG. 9, which includes the same components of FIG. 8—that is, camera input (901), noise estimator (903), motion classifier (905), spatial filter (907), temporal filter (909), combiner (911), external cues (913), and output (915). Unlike in FIG. 8 however, rather than having the two filtering stages after the motion classification being performed in parallel, the spatial filter is followed by the temporal filter in sequence, or as a cascade. According to one or more embodiments, a user may elect which of the two modes (viz. parallel and cascade) to use to perform noise reduction in a computing device. Alternately, a system may default to one mode, depending on the system's capabilities and hardware resources. For example, systems with lower relative processing or storage capabilities may operate in the cascade mode—which is less resource-intensive—whereas systems with greater resources may operate in parallel.

In either case, an optimal combiner (911) blends the outputs of the Spatial-temporal filters (907, 909) keeping in consideration any external cues (913) such as lighting, exposure, etc., which may influence the final result. By using a robust local noise estimate, this solution is able to improve the motion classification. By using the motion classification and a robust local noise estimate, the current method is able to achieve noise reduction while preserving important features and motion. By using the motion classification and an optimal combining strategy, the final visual output (915) can be improved.

In a lower complexity embodiment of the above methods, only one stage of filtering may be performed. The Spatial-temporal filter used in the low complexity embodiment is used for both motion classification as well for noise filtering and is chosen to be the one best suited for both operations. The parallel and cascade forms of these simplified methods are shown in FIGS. 10 and 11, respectively.

As depicted in FIG. 10, the noise reduction system (1000) includes input—such as video data—from a camera or camera module (1001), a noise estimator (1003) that receives the input data and estimates a local noise level. FIG. 10 also includes a motion classifier (1009) that classifies motion in a frame of input based on the noise level estimate after the filters have been applied. While the spatial-temporal filtering was depicted in FIGS. 8 and 9 as being performed after both the noise estimation and motion classification stages, in a lower complexity embodiment only a single pair of spatial (1005) and temporal (1007) filters may be applied adapted to both the noise estimation and motion classification, which a combiner (1011) then combines with external cues (1013) to generate an output (1015) with effectively reduced noise. As in FIGS. 8 and 9, the broken lines show non-video information and solid lines show the flow of video buffers.

Figure 11:
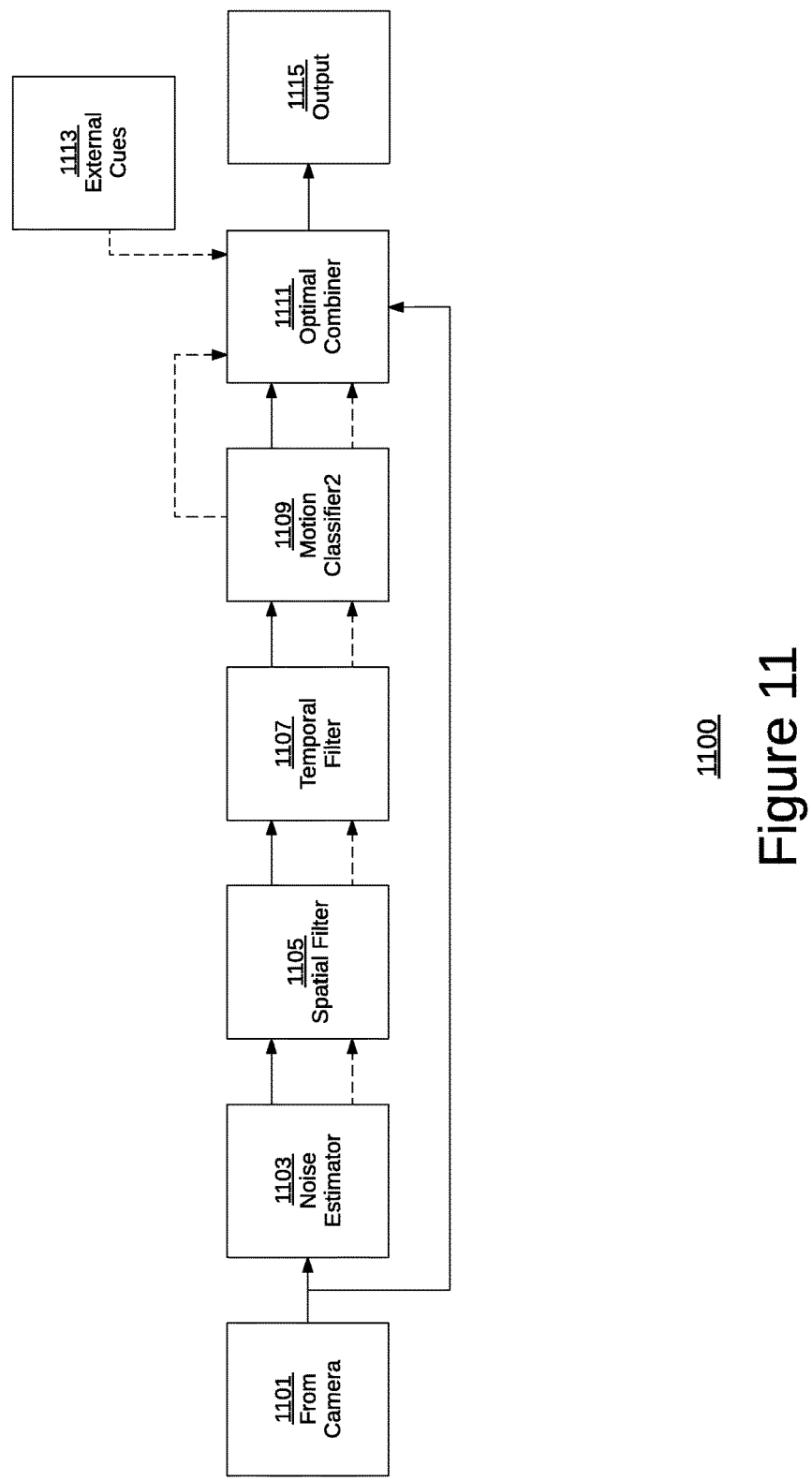
FIG. 11 depicts a block diagram of an exemplary lower complexity noise reduction system with noise filtering operating in a spatial-temporal cascade mode, in accordance with various embodiments of the present invention.

FIG. 11 is depicted to include the same components of FIG. 10 including a camera input (1101), noise estimator (1103), spatial filter (1105), temporal filter (1107), motion classifier (1109), combiner (1111), external cues (1113), and output (1115). Unlike in FIG. 10 however, rather than having the filtering stages being performed after the noise estimation in parallel, the spatial filter is followed by the temporal filter in sequence, or as a cascade. According to one or more embodiments, a user may elect which of the two modes (viz. parallel and cascade) to use to perform noise reduction in a computing device. Alternately, a system may default to one mode, depending on the system's capabilities and hardware resources. For example, systems with lower relative processing or storage capabilities may operate in the cascade mode—which is less resource-intensive—whereas systems with greater resources may operate in parallel.

In either case, a motion classifier (1109) and an optimal combiner (1111) blends the outputs of the Spatial-temporal filters (1107, 1109) keeping in consideration any external cues (913) such as lighting, exposure, etc., which may influence the final result. By using a robust local noise estimate, this solution is able to improve the motion classification. By using the motion classification and a robust local noise estimate, the current method is able to achieve noise reduction while preserving important features and motion. By using the motion classification and an optimal combining strategy, the final visual output (1115) can be improved.

Accordingly, embodiments of the present invention as described herein provide an effective solution for pre-processing video data to reduce noise. By initially computing a noise level estimate and classifying the motion, the various embodiments of the present invention are able to reduce, if not substantially eliminate, the unavoidable noise that results from conventional techniques using CMOS sensors while advantageously preserving inherent structure, features, and motion in the video.

Although the subject matter has been described in language specific to structural features and/or acts of one or more processes, it is to be understood that the subject matter defined in the appended claims is not necessarily limited to the specific features or acts described above. Rather, the specific features and acts described above are disclosed as example forms of implementing the claims.

What is claimed is:

1. A method for pre-processing captured video data, the method comprising:
receiving video data captured by a camera device, the video data comprising a plurality of frames;
calculating a local noise level estimate of a current frame of the plurality of frames;
determining a motion classification of a plurality of regions in the current frame of the captured video data based on the local noise level estimate; and
performing noise reduction on the current frame based on the local noise level estimation and the motion classification,
wherein the performing noise reduction comprises processing a first adaptive spatial filter and a first adaptive temporal filter, and
wherein the determining the motion classification comprises processing a second adaptive spatial filter and a second adaptive temporal filter.

2. The method according to claim 1, wherein the plurality of regions comprises a plurality of non-overlapping blocks in the current frame.

3. The method according to claim 2, wherein the calculating a local noise level estimate comprises hierarchically identifying a plurality of homogenous areas within the plurality of non-overlapping blocks.

4. The method according to claim 3, wherein the plurality of homogenous areas is identified using a plurality of directional activity operators.

5. The method according to claim 4, wherein a directional activity operator of the plurality of directional activity operators comprises a mean of absolute deviation of the plurality of homogenous areas.

6. The method according to claim 5, wherein the calculating the local noise level estimate comprises performing adaptive temporal filtering on the plurality of frames.

7. The method according to claim 6, wherein the performing temporal filtering comprises applying a first-order Infinite Impulse Response filter over the current frame and a previous frame of the plurality of frames.

8. The method according to claim 1, wherein the calculating the local noise level estimate comprises performing adaptive spatial filtering on the current frame.

9. The method according to claim 8, wherein the performing spatial filtering comprises applying a weighted sum of the plurality of homogenous areas to a first homogenous area in the current frame.

10. The method according to claim 1, wherein the determining a motion classification comprises calculating a sum of square difference (SSD) of the plurality of regions.

11. The method according to claim 1, wherein the performing the noise reduction on the current frame of the captured video data is further based on one or more external cues.

12. The method according to claim 11, wherein an external cue of the one or more external cues comprises at least one external cue from the group consisting of:
   a data corresponding to lighting conditions of the current frame;
   a user input;
   a measurement from an image signal processor (ISP) of the camera device.

13. The method according to claim 1, wherein the determining a motion classification of a plurality of regions in the current frame further comprises determining a motion classification of the plurality of regions in a plurality of previous frames.

14. A system for performing noise-reduction in video, the system comprising:
   a camera device comprising an image sensor configured to generate captured video data comprising a plurality of frames;
   a memory device configured to store a plurality of programmed instructions;
   a processor configured to execute the plurality of programmed instructions to implement:
      a noise estimator for computing a local noise level estimate for a current frame of the plurality of frames;
      a motion classifier for determining a motion classification of a plurality of regions in the current frame of the captured video data based on the local noise level estimate; and
      a combiner configured to perform noise reduction on the current frame based on the local noise level estimate and the motion classification,
   wherein the noise reduction comprises processing a first adaptive spatial filter and a first adaptive temporal filter, and
   wherein determining a motion classification comprises processing, by the motion classifier, a second adaptive spatial filter and a second adaptive temporal filter.

15. The system according to claim 14, wherein the noise estimator is further configured to perform adaptive spatial filtering on the current frame by applying a weighted sum of a plurality of homogenous areas to a first homogenous area in the current frame.

16. The system according to claim 14, wherein the noise estimator is further configured to perform adaptive temporal filtering on the local noise level estimate by applying a first-order Infinite Impulse Response filter over the current frame and a previous frame of the plurality of frames.

17. The system according to claim 14, wherein the combiner is further configured to perform the noise reduction based on one or more external cues.

18. The system according to claim 17, wherein an external cue of the one or more external cues comprises at least one external cue from the group consisting of:
   a data corresponding to lighting conditions of the current frame;
   a user input;
   a measurement from an image signal processor (ISP) of the camera device.

19. A non-transitory computer-readable medium comprising a plurality of programmed instructions, which, when executed by a processor in a computing device, is configured to perform noise reduction on frames of video data from an image capture device, the plurality of programmed instructions comprising:
   instructions to receive video data captured by an image capture device, the video data comprising a plurality of frames;
   instructions to calculate a local noise level estimate of a current frame of the plurality of frames;
   instructions to determine a motion classification of a plurality of regions in the current frame of the captured video data based on the local noise level estimate; and
   instructions to perform noise reduction on the current frame based on the local noise level estimation and the motion classification, wherein the instructions to perform noise reduction comprise instructions to process a first adaptive spatial filter and a first adaptive temporal filter, and wherein the instructions to determine the motion classification comprise instructions to process a second adaptive spatial filter and a second adaptive temporal filter.

* * * * *